(12) United States Patent
Guo

(10) Patent No.: US 12,544,580 B2
(45) Date of Patent: Feb. 10, 2026

(54) DETACHABLE LEADLESS PACEMAKER SYSTEM FOR CARDIAC CONDUCTION BUNDLE PACING

(71) Applicant: Chengjun Guo, Beijing (CN)

(72) Inventor: Chengjun Guo, Beijing (CN)

( * ) Notice: Subject to any disclaimer, the term of this patent is extended or adjusted under 35 U.S.C. 154(b) by 374 days.

(21) Appl. No.: 18/027,114

(22) PCT Filed: Oct. 11, 2022

(86) PCT No.: PCT/CN2022/124583
§ 371 (c)(1),
(2) Date: Mar. 19, 2023

(87) PCT Pub. No.: WO2024/031821
PCT Pub. Date: Feb. 15, 2024

(65) Prior Publication Data
US 2024/0316353 A1    Sep. 26, 2024

(30) Foreign Application Priority Data
Aug. 8, 2022 (CN) .......................... 202210946104.6

(51) Int. Cl.
*A61N 1/375* (2006.01)
*A61N 1/05* (2006.01)
*A61N 1/368* (2006.01)

(52) U.S. Cl.
CPC ....... *A61N 1/37512* (2017.08); *A61N 1/0573* (2013.01); *A61N 1/36842* (2017.08); *A61N 2001/0578* (2013.01)

(58) Field of Classification Search
CPC ............ A61N 1/37518; A61N 1/37512; A61N 1/0573
See application file for complete search history.

(56) References Cited

U.S. PATENT DOCUMENTS

| | | | |
|---|---|---|---|
| 2006/0287689 A1* | 12/2006 | Debruyne | A61N 1/05 607/57 |
| 2012/0041503 A1 | 2/2012 | Zhu | |
| 2016/0310722 A1* | 10/2016 | Demmer | A61N 1/37264 |
| 2018/0117336 A1 | 5/2018 | Ludwig et al. | |
| 2019/0255318 A1* | 8/2019 | Guo | A61N 1/057 |
| 2025/0108208 A1* | 4/2025 | Arnar | A61N 1/3754 |

FOREIGN PATENT DOCUMENTS

| | | |
|---|---|---|
| CN | 106362288 | 2/2017 |
| CN | 108434600 | 8/2018 |
| CN | 110870949 | 3/2020 |
| CN | 110870949 A | 3/2020 |

* cited by examiner

*Primary Examiner* — William J Levicky
(74) *Attorney, Agent, or Firm* — Treasure IP group, LLC

(57) ABSTRACT

A detachable leadless pacemaker system for cardiac conduction bundle pacing is disclosed. The system includes a detachable leadless pacemaker and a passive leadless pacemaker. A hook-shape side electrode is inserted into a ventricular septum for cardiac conduction bundle pacing. The detachable leadless pacemaker may be arranged in a ventricle, and the passive leadless pacemaker may be arranged in an atrium, so as to realize dual-chamber pacing both in the ventricle and in the atrium. The detachable leadless pacemaker is coupled with the passive leadless pacemaker by an anti-tension reinforced wire, which is used for pulling back the detachable leadless pacemaker to a new position.

22 Claims, 7 Drawing Sheets

DETACHABLE LEADLESS PACEMAKER SYSTEM FOR CARDIAC CONDUCTION BUNDLE PACING

The present disclosure is a Section 371 National Stage application of International Application No. PCT/CN2021/124583, which is filed on Oct. 11, 2021 and claims priority to a Chinese patent application filed on Aug. 8, 2022, Application No. 202210946104.6, entitled "DETACHABLE LEADLESS PACEMAKER SYSTEM FOR CARDIAC CONDUCTION BUNDLE PACING", the disclosure of which is herein incorporated by reference in its entirety including specification, claims, attached drawings and abstract.

FIELD OF THE DISCLOSURE

The present disclosure relates to the technical field of medical equipment, in particular to a detachable leadless pacemaker for cardiac conduction bundle pacing.

DESCRIPTION OF THE RELATED ART

Placing a miniature implant in a cardiac chamber is the latest diagnosis and treatment method in modern medicine. The miniature implants in the cardiac chamber include sensors for obtaining ECG, blood pressure, blood flow, blood biochemistry and other parameters, and include miniature treatment equipment for slowly releasing a drug, for cardiac pacing, and for other treatments. In order to place a miniature implant into a cardiac chamber, it is necessary to perform transcatheter interventional surgery, in which the miniature implant is transported to and fixed at a specific position in the cardiac chamber, so as to prevent complications such as implant failure or embolism due to displacement or dislocation of the miniature implant.

Pacemakers are widely used as implants in human body. Today, millions of people around the world are implanted with artificial pacemakers each year to help keep their hearts beating normally. When a doctor install a pacemaker for a patient, the doctor usually places the pacemaker under thoracic muscle, and place the pacemaker in a cardiac chamber through one or several wires and electrodes to sense ECG activity and stimulate myocardial beating. These wires affect the opening and closing of heart valves with each heartbeat, which causes complications such as heart failure over time due to hemodynamic changes of the heart. A wireless miniature pacemaker is newly developed internationally, which has a size and a shape like a drug capsule, without the need for wires, and which can be placed directly in a cardiac chamber, without affecting the opening and closing of the heart valves, thereby reducing complications and simplifying operation. Due to a small size of the wireless pacemaker, the patient can have a new implantation experience, and an infection rate of the implanted system is greatly reduced.

It is a new challenge to implant a wireless miniature pacemaker at a predetermined position in the cardiac chamber. Due to the impact of heartbeat and blood flow, the wireless miniature pacemaker tends to detach from the myocardium and displace and move within the cardiac chamber. A transport tool for a wireless pacemaker has proven to be a major technical challenge problem in itself, and this challenge has limited the further development and promotion of this new technology.

An existing wireless miniature pacemaker is typically fixed at its top. For example, a spiral wire or a hook is formed at one end of a housing, and the spiral wire is screwed into myocardium or the hook is attached to intraventricular reticular myocardial structure so as to fix the wireless miniature pacemaker. Due to the impact of heartbeat and blood flow, the wireless miniature pacemaker tends to detach from the myocardium and displace and move within the cardiac chamber, resulting in embolism or poor contact between the electrodes and the myocardium, which affects ECG perception and pacing effect. Moreover, the lack of reticular tissue in atrium makes it impossible to achieve atrial pacing and cardiac dual-chamber pacing with the existing fixation member, and the effectiveness and safety of pacing are difficult to be guaranteed.

SUMMARY OF THE DISCLOSURE

The content of the disclosure is used to present ideas in a brief form that will be described in detail in the embodiments there below. The content of the disclosure is neither intended to identify key features or essential features of the technical solution as claimed, nor intended to limit the protection scope of the technical solution as claimed.

Some embodiments according to the present disclosure propose a detachable leadless pacemaker system that stimulates a cardiac conduction bundle to address the technical problems as mentioned in the background.

According to some embodiments according to the present disclosure, there is provided a detachable leadless pacemaker system for cardiac conduction bundle pacing, comprising: a detachable leadless pacemaker with a first data interface; a passive leadless pacemaker with a second data interface; and a signal wire which is coupled with the first data interface and the second data interface to supply power from the detachable leadless pacemaker to the passive leadless pacemaker, and to support communication therebetween.

Preferably, the detachable leadless pacemaker comprises: a first pacemaker body with a first detachable structure; and a first hook-shape side electrode which is fixed with the first pacemaker body by the first detachable structure, and which is arranged in parallel with the first pacemaker body at a first predetermined distance.

Preferably, the first pacemaker body includes a first housing, wherein the first housing comprises a housing body, at one end of which the first detachable structure is provided, the housing body is provided with at least one first annular electrode and a first annular insulator which is arranged between adjacent one of the at least one first annular electrode.

Preferably, the first detachable structure comprises a first through hole, a second through hole and a restriction pin, the first through hole has at least one first clamping groove structure, the second through hole passes through the first through hole in a direction perpendicular to a plane formed by an axial direction of the housing body and an axial direction of the first through hole, the second through hole has a diameter smaller than that of the first through hole, and the restriction pin comprises a restriction post and a restriction handle, wherein the restriction post is arranged in the second through hole, and the restriction handle is exposed outside the first detachable structure.

Preferably, the first hook-shape side electrode includes a second housing, wherein the second housing comprises a first end, an electrode body and a second end which are arranged in this order, the first end is a first curved structure including a fixing post which has a third through hole and at least one second clamping groove structure, the at least one second clamping groove structure is engaged with the at least one first clamping groove structure and the third through hole and the second through hole are aligned with each other when the fixing post is inserted into the first through hole, so that the restriction post of the restriction pin is inserted into the second through hole and the third through hole, the electrode body is provided with at least one second annular electrode and a second annular insulator which is arranged between adjacent one of the at least one second annular electrode, and the at least one second annular electrode is provided respectively for the at least one first annular electrode, the second end is conical.

Preferably, the first pacemaker body further includes an internal circuit inside the first housing, wherein the internal circuit includes a circuit board and a battery coupled to the circuit board, the battery supplies power to the circuit board, the circuit board is arranged on a side close to the first detachable structure, and the battery is arranged on a side far away from the first detachable structure, the circuit board includes at least one first contact for connecting the at least one first annular electrode.

Preferably, the first pacemaker body comprises at least one first electrode lead for the at least one first annular electrode, the at least one first electrode lead is arranged in the first housing, including a first electrode lead with one end being coupled with corresponding one of the at least one first annular electrode and the other end being coupled with corresponding one of the at least one first contact.

Preferably, the circuit board is provided with a wireless communication module for information interaction with an external programmable instrument.

Preferably, a first switch is provided between the circuit board and corresponding one of the at least one first annular electrode, the first switch is used for controlling connection and disconnection between the circuit board and the first annular electrode.

Preferably, the first detachable structure is provided with at least one second contact at a side near the housing body, and the at least one second contact is coupled to the circuit board.

Preferably, a second switch is provided between the circuit board and each of the at least one second contact, the second switch is used for controlling connection and disconnection between the circuit board and the second contact.

Preferably, the first hook-shape side electrode comprises at least one second electrode lead respectively for the at least one second annular electrode, the at least one second electrode lead is arranged in the second housing, including a second electrode lead with one end being coupled with corresponding one of the at least one second annular electrode and the other end being arranged in the fixing post, the at least one second electrode lead is coupled with corresponding one of the at least one second contact when the fixing post is inserted into the first through hole.

Preferably, the first annular electrode is coupled with a first power terminal of the battery on the circuit board through the corresponding first contact, and the second annular electrode is coupled with a second power terminal of the battery on the circuit board through the corresponding second contact.

Preferably, the first annular insulator is provided with an array of apertures at a side near the first hook-shape side electrode, including at least one aperture for holding a drug.

Preferably, at least one first positioning structure is provided at the second end of the second housing at a side near the first pacemaker body.

Preferably, the passive leadless pacemaker comprises: a second pacemaker body with a second detachable structure; a second hook-shape side electrode which is fixed with the second pacemaker body by the second detachable structure, and which is arranged in parallel with the second pacemaker body at a second predetermined distance.

Preferably, the detachable leadless pacemaker is provided with a first connection part on the first detachable structure, the passive leadless pacemaker is provided with a second connection part on the second detachable structure, the first connection part and the second connection part are used for achieving a reliable connection between the detachable leadless pacemaker and the passive leadless pacemaker.

Preferably, the first hook-shape side electrode has an insertion direction which is opposite to that of the second hook-shape side electrode in a state that the first connection part and the second connection part are reliably connected.

Preferably, the detachable leadless pacemaker system further includes a mounting wire with a first wire end having a first ring and a second wire end having second ring, the first ring surrounds the first curved structure of the first hook-shape side electrode of the detachable leadless pacemaker, and the second ring that surrounds the second curved structure of the second hook-shape side electrode of the passive leadless pacemaker.

Preferably, the second pacemaker body includes at least one third annular electrode and a third annular insulator which is arranged between adjacent one of the at least one third annular electrode, the second hook-shape side electrode comprises at least one fourth annular electrode and a fourth annular insulator which is arranged between adjacent one of the at least one fourth annular electrode, and the passive leadless pacemaker encapsulates an electronic circuit which is coupled to the at least one third annular electrode and the at least one fourth annular electrode, respectively.

The above embodiments according to the present disclosure have the following beneficial effects: in the detachable leadless pacemaker system for cardiac conduction bundle pacing according to some embodiments according to the present disclosure, the detachable leadless pacemaker may be arranged in the ventricle and the passive leadless pacemaker may be arranged in the atrium, and the detachable leadless pacemaker supplies power and signals to the passive leadless pacemaker via signal wires. In a case that the first hook-shape side electrode is inserted into ventricular septum, the first pacemaker body is closely attached to an inner wall of the ventricle, thus increasing a contact surface and improving stability between the detachable leadless pacemaker and the inner wall of the ventricle. The first hook-shape side electrode and the first pacemaker body may be provided with a plurality of groups of annular electrodes. One preferable group of electrodes may be selected for pacing in view of actual requirements. With an annular structure, the contact surface between the electrode and the inner wall of the ventricle is greatly increased so as to improve effectiveness of pacing. The second hook-shape side electrode of the passive leadless pacemaker is coupled with the detachable leadless pacemaker by wires, for sensing atrial electrical signals and applying electrical stimulation, thereby realizing dual-chamber pacing in the ventricle and the atrium. The detachable leadless pacemaker is coupled with the passive leadless pacemaker by an anti-tension reinforced wire, which is used for pulling back the detachable leadless pacemaker to a new position.

BRIEF DESCRIPTION OF THE DRAWINGS

These and other features, advantages and aspects of embodiments according to the present disclosure will become more apparent in conjunction with the accompanying drawings and with reference to the following specific embodiments. Throughout the accompanying drawings, identical or similar numerals indicate identical or similar elements. It should be understood that the accompanying drawings are schematic and that the elements and components are not necessarily drawn to scale.

DETAILED DESCRIPTION OF EMBODIMENTS OF THE DISCLOSURE

Embodiments according to the present disclosure will be described in greater detail below with reference to the accompanying drawings. While certain embodiments according to the present disclosure are shown in the accompanying drawings, it should be understood, however, that the present disclosure may be implemented in various forms and should not be construed as limited to the embodiments set forth herein. Rather, these embodiments are provided for a more thorough and complete understanding according to the present disclosure. It should be understood that the accompanying drawings and embodiments according to the present disclosure are for exemplary purposes only and are not intended to limit the scope of protection according to the present disclosure.

It is also to be noted that, for ease of description, only those portions of the accompanying drawings that relate to the invention in question are shown. The embodiments and the features in the embodiments according to the present disclosure may be combined with each other in the absence of conflict.

Note that the concepts "first", "second", etc., referred to in this disclosure are used only to distinguish between different devices, modules or units, and are not intended to limit the order or interdependence of the functions performed by these devices, modules or units.

It should be noted that the modifications of "one" and "more than one" mentioned in this disclosure are schematic and not limiting, and it should be understood by those skilled in the art that unless the context clearly indicates otherwise, they should be understood as "one or more" unless the context clearly indicates otherwise.

The names of the messages or information being interacted between the plurality of devices in this disclosure are for illustrative purposes only and are not intended to limit the scope of those messages or information.

Figure 1:
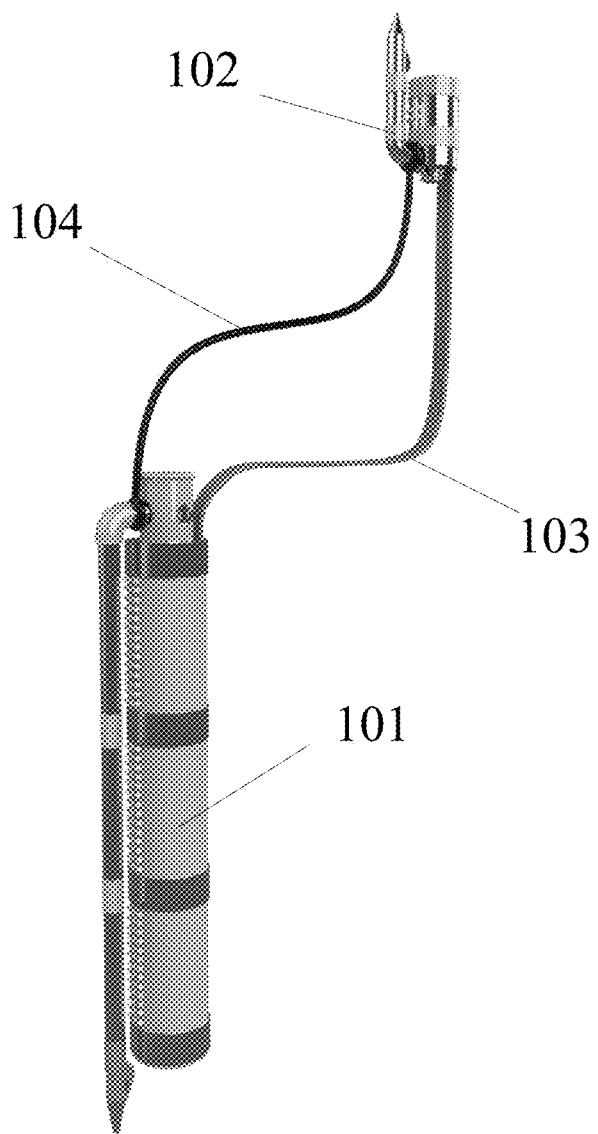
FIG. 1 is a structural schematic diagram of a detachable leadless pacemaker system for cardiac conduction bundle pacing of some embodiments according to the present disclosure.

FIG. 1 is a structural schematic diagram of a detachable leadless pacemaker system for cardiac conduction bundle pacing in accordance with some embodiments according to the present disclosure. The detachable leadless pacemaker system for cardiac conduction bundle pacing may include a detachable leadless pacemaker 101 and a passive leadless pacemaker 102, which are coupled with each other by signal wires 103. The detachable leadless pacemaker 101 is used for being arranged in a ventricle and the passive leadless pacemaker 102 is used for being arranged in an atrium. The detachable leadless pacemaker 101 is provided with a first data interface 10114.

The passive leadless pacemaker 102 is provided with a second data interface 1025. The signal wires 103 are respectively coupled with the first data interface 10114 and the second data interface 1025 for supplying power from the detachable leadless pacemaker 101 to the passive leadless pacemaker 102 and for supporting data communication between the detachable leadless pacemaker 101 and the passive leadless pacemaker second pacemaker 102 and for supporting data communication between the detachable leadless pacemaker 101 and the passive leadless pacemaker 1.

Figure 2:
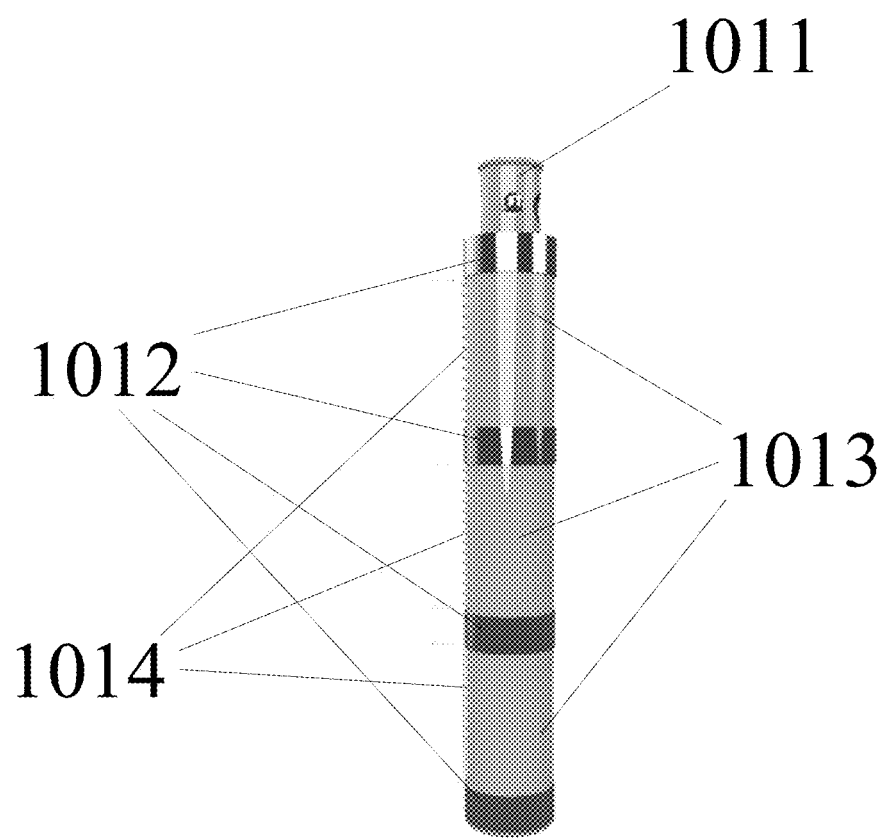
FIG. 2 is a structural schematic diagram of a first pacemaker body according to the present disclosure.
Figure 4:
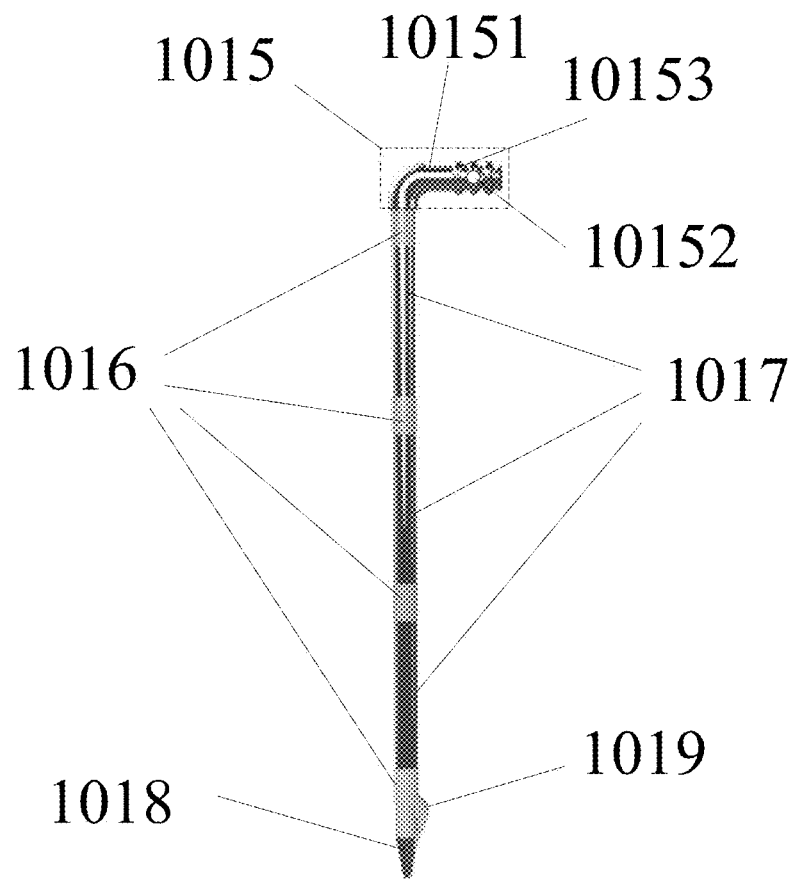
FIG. 4 is a structural schematic diagram of a first hook-shape side electrode according to the present disclosure.

The detachable leadless pacemaker 101 may include a first pacemaker body and a first hook-shape side electrode. The structural schematic diagram of the first pacemaker body is shown in FIG. 2. The structural schematic diagram of the first hook-shape side electrode is shown in FIG. 4. The first pacemaker body is provided with a first detachable structure 1011. The first hook-shape side electrode is fixed with the first pacemaker body by the first detachable structure 1011, and is arranged in parallel with the first pacemaker body at a first predetermined distance. As can be seen from FIG. 2, the detachable leadless pacemaker 101 may be implanted in the heart, with the first hook-shape side electrode being inserted the ventricular septum, so that the first pacemaker body abuts against the ventricular wall at a side. During myocardial motion, the detachable leadless pacemaker 101 can move together with the myocardium (i.e. being relatively stationary between the detachable leadless pacemaker and the myocardium).

The present disclosure fixes the first pacemaker body with the first hook-shape side electrode, and the first pacemaker body is closely attached to an inner wall of the ventricle, so that a contact area between the detachable leadless pacemaker 101 according to the present disclosure and the myocardium is increased and the pacemaker 101 can move together with the myocardium. Thus, the detachable leadless pacemaker 101 has improved stability in the ventricle, and has greatly reduced possibility of electrode dislocation.

Meanwhile, the detachable leadless pacemaker 101 according to the present disclosure has a length of about 40 mm (millimeter). The first hook-shape side electrode can be inserted near the left bundle branch and the right bundle branch of the ventricular septum, which are the "highway" of cardiac conduction. Therefore, the first hook-shape side electrode according to the present disclosure may apply stimulation more effectively. Meanwhile, the first hook-shape side electrode may also have the function of sampling electrical signals of the heart, so as to analyze the electrical signals of the heart.

The first housing of the first pacemaker body according to the present disclosure includes a housing body, and the first detachable structure 1011 is provided at one end of the housing body. The housing body is provided with at least one first annular electrode 1012 (four, in FIG. 2), and a first annular insulator 1013 is provided between adjacent ones of the at least one first annular electrode 1012. The adjacent ones of the at least one first annular electrode 1012 may have an equal distance. The electrodes according to the present disclosure may have an annular shape, to provide a large electrode contact surface, and may have a contact point between the first annular electrode 1012 and the myocardium which is automatically adjusted according to a position of the detachable leadless pacemaker 101 in the ventricle. Thus, the position of the detachable leadless pacemaker 101 need not be adjusted repeatedly, thereby ensuring the effectiveness of pacing.

Figure 3:
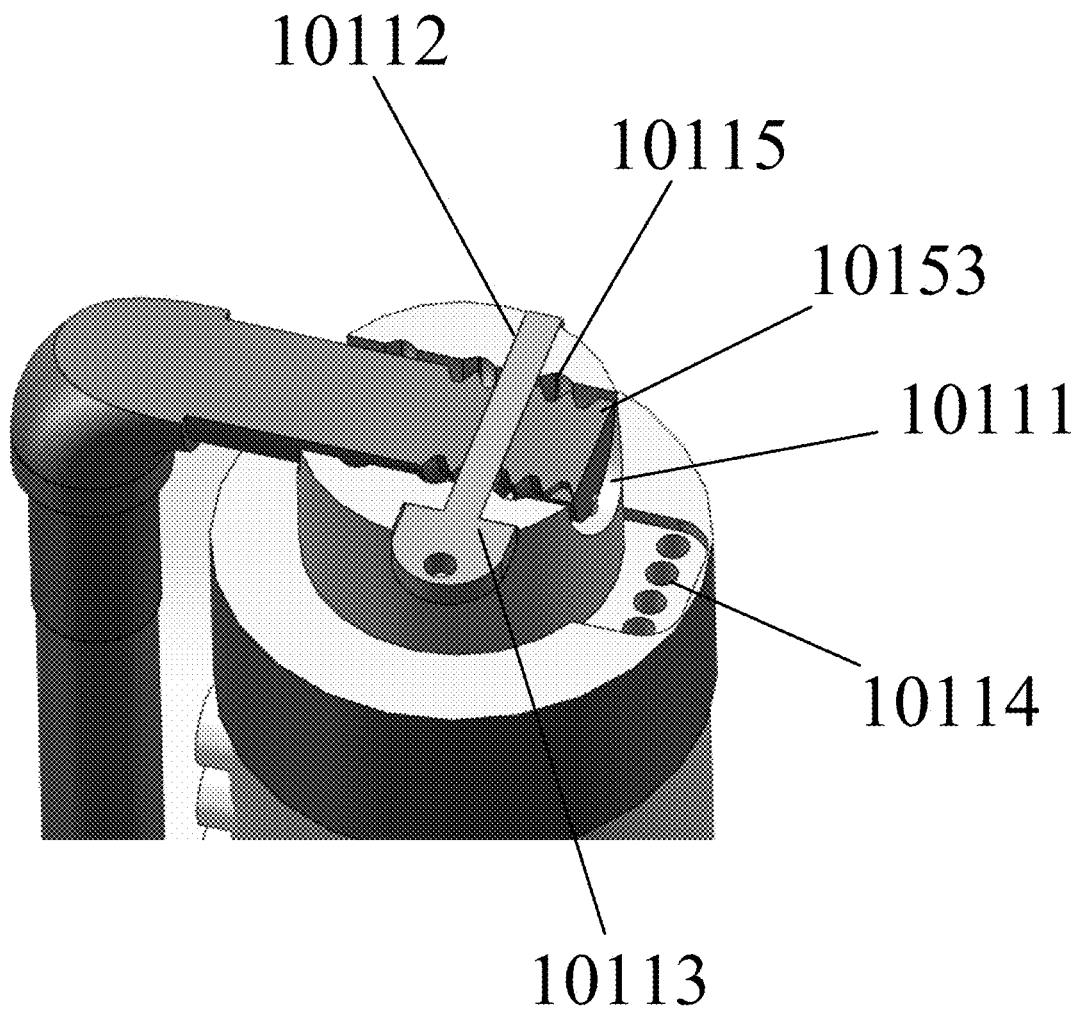
FIG. 3 is a structural schematic diagram of a first detachable structure 1011 according to the present disclosure.

FIG. 3 is a structural schematic diagram of the first detachable structure 1011. The first detachable structure 1011 includes a first through hole 10111, a second through hole 10112 and a restriction pin 10113. The first through hole 10111 has at least one first clamping groove structure 10115 in the first through hole 10111. The second through hole 10112 passes through the first through hole 10111 in a direction perpendicular to a plane formed by an axial direction of the housing body and an axial direction of the first through hole 10111. Generally, the second through hole 10112 has a diameter smaller than that of the first through hole 10111. The restriction pin 10113 includes a restriction post and a restriction handle, wherein the restriction post is arranged in the second through hole 10112, and the restriction handle is exposed outside the first detachable structure 10.

As shown in FIG. 4, the first hook-shape side electrode includes a second housing which may have a first end 1015, an electrode body and a second end 1018 arranged in this order.

The first end 1015 is a first curved structure and includes a fixing post 10151 which includes a third through hole 10152 and at least one second clamping groove structure 10153. In a state that the fixing post 10151 is inserted into the first through hole 10111, the at least one second clamping groove structure 10153 is engaged with the at least one first clamping groove structure 10115, and the third through hole 10152 is engaged with the second through hole 10112 (see FIG. 3, the third through hole 10152 and the second through hole 10112 overlap with each other), so that the restriction post of the restriction pin 10113 is inserted into the second through hole 10112 and the third through hole 10152. At least one second annular electrode 1016 is arranged on the electrode body, and a second annular insulator 1017 is arranged between adjacent ones of the second annular electrodes 1016, and the at least one second annular electrode 1016 corresponds to the at least one first annular electrode 1012, as shown in FIG. 1. The second end 1018 is conical so that it may be inserted into the myocardium.

Figure 5:
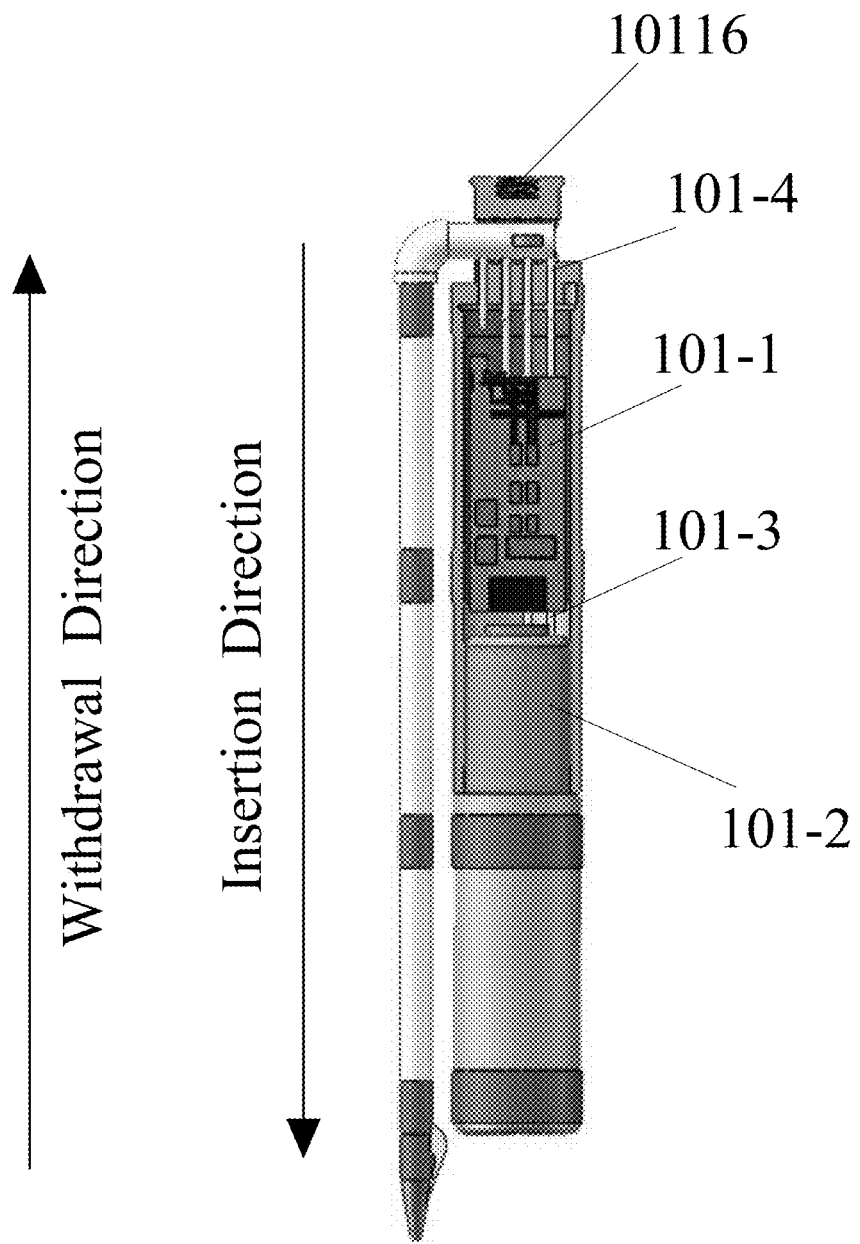
FIG. 5 is a cross-sectional view of a detachable leadless pacemaker according to the present disclosure.

The first pacemaker body further comprises an internal circuit in the first housing. FIG. 5 is a planed view of the pacemaker body of a cylindrical shape. The internal circuit includes a circuit board 101-1 at a side near the first detachable structure 1011 and a battery 101-2 at a side far away from the first detachable structure 1011, and the battery 101-2 is coupled to the circuit board 101-1 to supply power to the circuit board 101-1. The circuit board 101-1 includes at least one first contact 101-3 for connecting the at least one first annular electrode 1012. Thus, the circuit board 101-1 supplies power to the at least one first annular electrode 1012 through at least one first contact 101-3. Typically, the battery 101-2 has a weight greater than that of the circuit board 101-1. In a case that the detachable leadless pacemaker 101 is inserted downward into the ventricular septum in the ventricular chamber in an insertion direction shown in FIG. 5, the entire detachable leadless pacemaker 101 has a lower center of gravity, thereby reducing the possibility that the detachable leadless pacemaker 101 detaches from the ventricular septum, and improving stability of the detachable leadless pacemaker 101 after being mounted.

The circuit board 101-1 may be provided with a wireless communication module for information interaction with an external programmable instrument. The external programmable instrument can be placed on the body surface near the heart outside the body, and establish information interaction with the wireless communication module.

The first pacemaker body further includes at least one first electrode lead corresponding to the at least one first annular electrode 1012, the at least one first electrode lead is arranged in the first housing, with one end being coupled to corresponding one of the at least one first annular electrode 1012, and the other end being coupled to corresponding one of the at least one first contact 101-3. Thus, the circuit board 101-1 can supply power to the first annular electrode 1012 through the first electrode lead and the first contacts 101-3.

The detachable leadless pacemaker 101 according to the present disclosure is provided with a plurality of first annular electrodes 1012 and a plurality of second annular electrodes 1016. In an actual application, the preferable first annular electrode 1012 and the preferable second annular electrode 1016 may be selected for stimulation. For this purpose, it is necessary to test each group of first annular electrode 1012 and second annular electrode 1016. Therefore, when testing a certain group of first annular electrodes 1012 and second annular electrodes 1016, signals will not be supplied to other first annular electrodes 1012 and other second annular electrodes 1016. For this purpose, a first switch may be provided between the circuit board 101-1 and each of the first annular electrodes 1012, and the first switch is used for controlling the connection and disconnection between the circuit board 101-1 and the first annular electrode 1012. Similarly, a second switch is provided between the circuit board 101-1 and each of the at least one second contact 101-4, and the second switch is used for controlling connection and disconnection between the circuit board 101-1 and the second contact 101-4.

The circuit board 101-1 also needs to supply power to the second annular electrode 1016 on the first hook-shape side electrode. For this reason, the first detachable structure 1011 according to the present disclosure is provided with at least one second contact 101-4 at a side near the housing body, wherein the at least one second contact 101-4 is coupled with the circuit board 101-1.

The first hook-shape side electrode may also include at least one second electrode lead corresponding to the at least one second annular electrode 1016, and the at least one second electrode lead is arranged in the second housing, with one end being coupled to corresponding one of the at least one second annular electrode 1016, and the other end being arranged in the fixed post 10151. The at least one second electrode lead is coupled to corresponding one of the at least one second contact 101-4 in a state that the fixing post 10151 is inserted into the first through hole 10111. Thus, the circuit board 101-1 may supply power to the second annular electrode 1016 through the second electrode lead and the second contacts 101-4.

In practice, in order to realize pacing, the first annular electrode 1012 and the second annular electrode 1016 need to be coupled to different terminals of power source. When the first annular electrode 1012 is coupled to a positive terminal of the power source, the second annular electrode 1016 needs to be coupled to a negative terminal of the power source. That is, the first annular electrode 1012 is coupled to a first terminal of the battery 101-2 on the circuit board 101-1 through the corresponding first contact 101-3, and the second annular electrode 1016 is coupled to the second terminal of the battery 101-2 on the circuit board 101-1 through the corresponding second contact 101-4.

In a case that the first hook-shape side electrode is inserted into the interventricular septum, it will inevitably cause destruction of the interventricular septum tissue. The interventricular septum itself will repair the damaged tissue, and usually a new layer of tissue will be wrapped around the damaged tissue. However, the new layer of tissue will reduce or even block the signal transmission between the first annular electrode 1012 and the second annular electrode 1016, resulting in weak pacing signal or even failure of pacing. For this purpose, the first annular insulator 1013 is provided with an array of apertures 1014 near the first hook-shape side electrode, and the array of apertures 1014 includes at least one aperture for holding a drug in the aperture. The drug in the aperture can slow down the formation of new tissue in the ventricular septum and ensure normal pacing between the first annular electrode 1012 and the second annular electrode 1016. Meanwhile, as known from the above description, a plurality of groups of first annular electrodes 101 and second annular electrodes 1016 exist in the present disclosure. As long as the plurality of groups of first annular electrodes 101 and second annular electrodes 1016 are not completely covered, the detachable leadless pacemaker 101 according to the present disclosure can realize pacing. In this way, the effectiveness of pacing is greatly improved.

As can be seen from FIG. 2, the first annular insulator 1013 according to the present disclosure has a large space, and the first annular insulator 1013 may be provided with various sensors in view of actual requirements.

In order to further improve stability of the detachable leadless pacemaker 101, the second end 1018 of the second housing is provided with at least one first positioning structure 1019 at a side near the first pacemaker body. The first positioning structure 1019 according to the present disclosure is shown in FIG. 4. An angle of the first positioning structure 1019 in an insertion direction is smaller than an angle in a withdrawal direction, so that the first hook-shape side electrode can be easily inserted into the compartment septum, and the first hook-shape side electrode can be locked to prevent the first hook-shape side electrode from detaching the compartment septum. Meanwhile, the second end 1018 of the second housing extends beyond the first pacemaker body, which may reduce the pressure on a mounting catheter when implanting the detachable leadless pacemaker 101 to some extent. When the detachable leadless pacemaker 101 enters the ventricle, the second end 1018 beyond the first pacemaker body typically first contacts the myocardial tissue (ventricular septum or other location), thus facilitating insertion into the myocardial tissue.

As shown in FIG. 1, the passive leadless pacemaker 102 may include a second pacemaker body and a second hook-shape side electrode. The structural schematic diagram of the second pacemaker body is shown in FIG. 6, and the structural schematic diagram of the second hook-shape side electrode is shown in FIG. 7.

Figure 6:
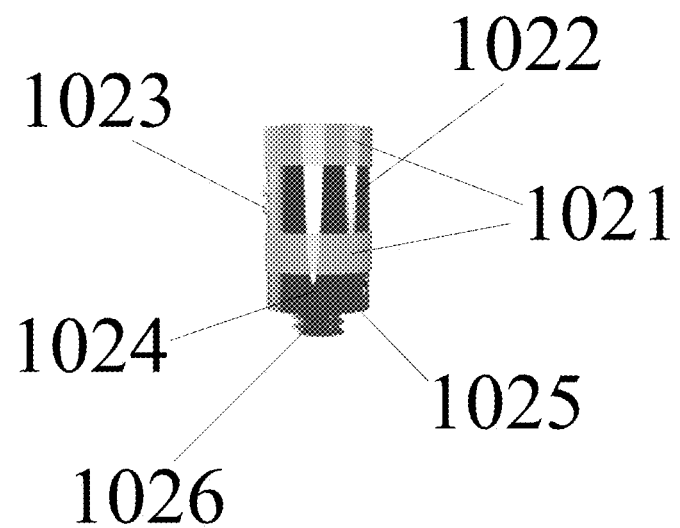
FIG. 6 is a structural schematic diagram of a second pacemaker body according to the present disclosure.
Figure 7:
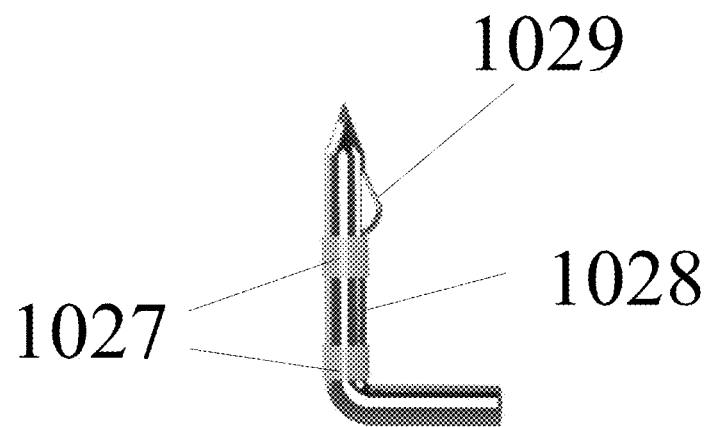
FIG. 7 is a structural schematic diagram of a second hook-shape side electrode according to the present disclosure.

As can be seen from FIG. 6, the second pacemaker body is provided with a second detachable structure 1024, and the second hook-shape side electrode is fixed with the second pacemaker body through the second detachable structure 1024. The second hook-shape side electrode is arranged in parallel with the second pacemaker body at a second predetermined distance. The second pacemaker body may also include at least one third annular electrode 1021 (two, in FIG. 6), and a third annular insulator 1022 is provided between adjacent ones of the third annular electrodes 1021, and an aperture 1023 is provided at a side near the second hook-shape side electrode. The second hook-shape side electrode may include at least one fourth annular electrode 1027 (two, in FIG. 7), a fourth annular insulator 1028 and a second positioning structure 1029. A fourth annular insulator 1028 is provided between adjacent ones of the at least one fourth annular electrode 1027. The third annular electrode 1021 and the fourth annular electrode 1027 are arranged in correspondence to enable pacing of the atria.

The second pacemaker body of the passive leadless pacemaker 102 may have electronic circuit being encapsulated, which is coupled to the at least one third annular electrode and the at least one fourth annular electrode, respectively, for sensing cardiac electrical signals from the fourth annular electrode and as a carrier for the at least one third annular electrode and the at least one fourth annular electrode.

It should be noted that the second pacemaker body of the passive leadless pacemaker 102 may not have no electronic circuit, battery and other electronic components. The passive leadless pacemaker 102 may receive electric energy from the battery 101-2 of the detachable leadless pacemaker 101 through the signal wires 103. Thus, the structure of the passive leadless pacemaker 102 can be simplified and the weight of the passive leadless pacemaker 102 can be reduced.

The detachable leadless pacemaker 101 is provided with a first connection part 10116 on the first detachable structure 1011 as shown in FIG. 5. The passive leadless pacemaker 102 is provided with a second connection part 1026 on the second detachable structure 1024. The first connecting portion 10116 and the second connecting portion 1026 are used to achieve a reliable connection between the detachable leadless pacemaker 101 and the passive leadless pacemaker 102.

Figure 8:
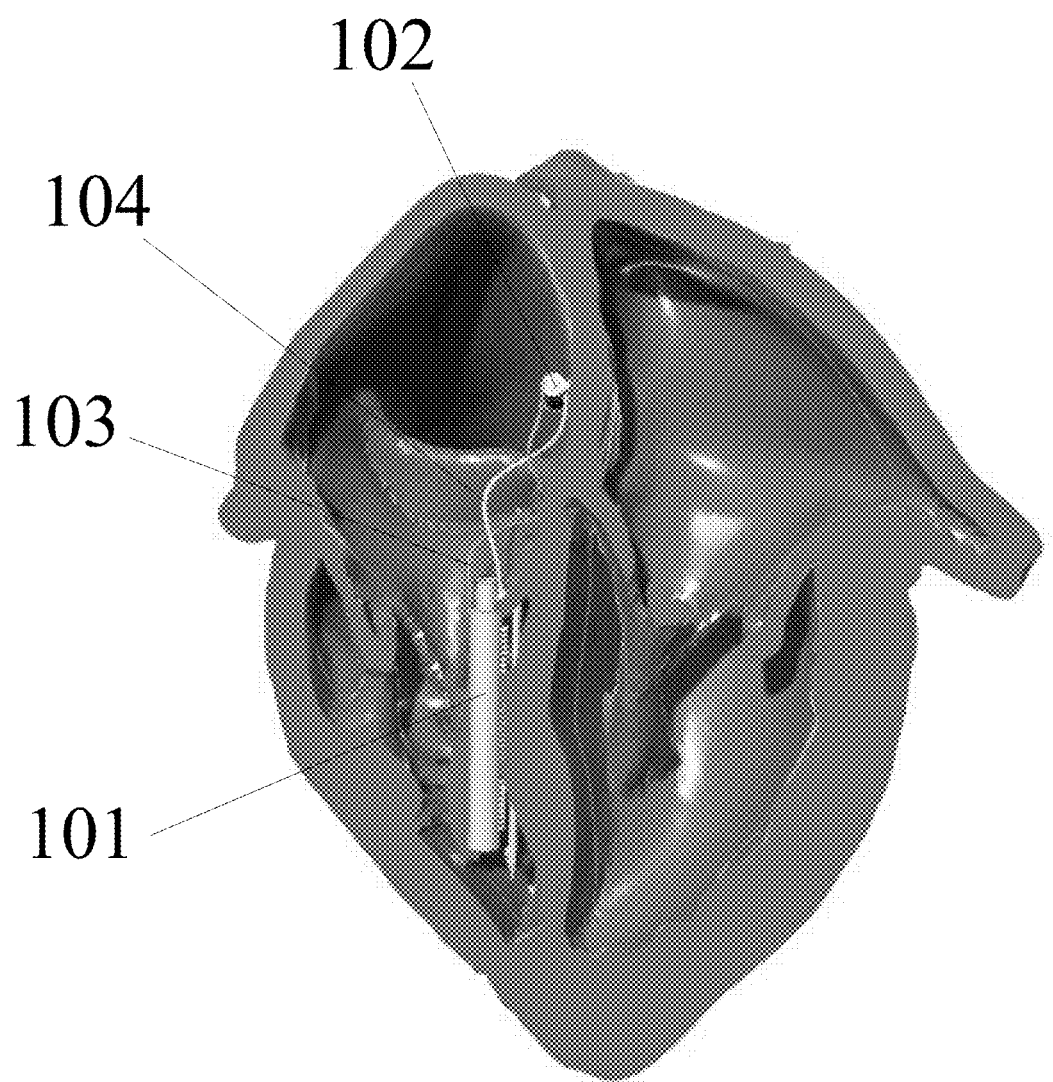
FIG. 8 is a schematic diagram of a detachable leadless pacemaker system into the heart for cardiac conduction bundle pacing according to the present disclosure.

FIG. 8 is a schematic diagram of a detachable leadless pacemaker system into the heart for cardiac conduction bundle pacing. In order to facilitate mounting, in a state that the first connection part 10116 and the second connection part 1026 are reliably connected, an insertion direction of the first hook-shape side electrode is opposite to an insertion direction of the second hook-shape side electrode, as shown in FIG. 1. Thus, in a case that the detachable leadless pacemaker 101 is disposed in the atrium, the passive leadless pacemaker 102 may conveniently be disposed in the atrium, as shown in FIG. 8.

The detachable leadless pacemaker system for cardiac conduction bundle pacing further includes mounting wires 104, the first end of the mounting wire 104 includes a first ring which surrounds the first curved structure of the first hook-shape side electrode of the detachable leadless pacemaker 101, and the second end of the mounting wire 104 includes a second ring which surrounds the second curved structure of the second hook-shape side electrode of the passive leadless pacemaker 102, as shown in FIG. 1.

The above description is only a description of some preferred embodiments according to the present disclosure and of the principles of the techniques employed. Those skilled in the art will understand that the scope of the invention referred to in the embodiments according to the present disclosure is not limited to technical solutions formed by specific combinations of the above technical features, but also should cover other technical solutions formed by arbitrary combinations of the above technical features or their equivalent features without departing from the above inventive concept. For example, the above features are replaced with (but not limited to) the technical features with similar functions disclosed in the embodiments according to the present disclosure.

What is claimed is:

1. A detachable leadless pacemaker system for cardiac conduction bundle pacing, comprising:
   a detachable pacemaker, having a battery and with a first data interface;
   a passive pacemaker, with a second data interface; and
   a signal wire which is coupled with the first data interface and the second data interface to supply power from the detachable pacemaker to the passive pacemaker, and to support communication therebetween,
   wherein the detachable pacemaker comprises:
   a first pacemaker body with a first detachable structure; and
   a first hook-shape side electrode which is fixed with the first pacemaker body by the first detachable structure, and which is arranged in parallel with the first pacemaker body at a first predetermined distance;
   the passive pacemaker has no battery, but is applied with power from the detachable pacemaker and has its own electrode for stimulating myocardial beating.

2. The detachable leadless pacemaker system for cardiac conduction bundle pacing according to claim 1, wherein the first pacemaker body is cylindrical.

3. The detachable leadless pacemaker system for cardiac conduction bundle pacing according to claim 1, wherein the first pacemaker body includes a first housing,
   wherein the first housing comprises a housing body, at one end of which the first detachable structure is provided,
   the housing body is provided with at least one first annular electrode and a first annular insulator which is arranged between adjacent one of the at least one first annular electrode.

4. The detachable leadless pacemaker system for cardiac conduction bundle pacing according to claim 3, wherein the first detachable structure comprises a first through hole, a second through hole and a restriction pin, the first through hole has at least one first clamping groove structure, the second through hole passes through the first through hole in a direction perpendicular to a plane formed by an axial direction of the housing body and an axial direction of the first through hole, the second through hole has a diameter smaller than that of the first through hole, and the restriction pin comprises a restriction post and a restriction handle, wherein the restriction post is arranged in the second through hole, and the restriction handle is exposed outside the first detachable structure.

5. The detachable leadless pacemaker system for cardiac conduction bundle pacing according to claim 4, wherein the first pacemaker body further includes an internal circuit inside the first housing,
   wherein the internal circuit includes a circuit board and a battery coupled to the circuit board, the battery supplies power to the circuit board, the circuit board is arranged on a side close to the first detachable structure, and the battery is arranged on a side far away from the first detachable structure,
   the circuit board includes at least one first contact for connecting the at least one first annular electrode.

6. The detachable leadless pacemaker system for cardiac conduction bundle pacing according to claim 5, wherein the first pacemaker body comprises at least one first electrode lead for the at least one first annular electrode, the at least one first electrode lead is arranged in the first housing, including a first electrode lead with one end being coupled with corresponding one of the at least one first annular electrode and the other end being coupled with corresponding one of the at least one first contact.

7. The detachable leadless pacemaker system for cardiac conduction bundle pacing according to claim 5, wherein the circuit board is provided with a wireless communication module for information interaction with an external programmable instrument.

8. The detachable leadless pacemaker system for cardiac conduction bundle pacing according to claim 5, wherein a first switch is provided between the circuit board and corresponding one of the at least one first annular electrode, the first switch is used for controlling connection and disconnection between the circuit board and the first annular electrode.

9. The detachable leadless pacemaker system for cardiac conduction bundle pacing of claim 3, wherein the first hook-shape side electrode includes a second housing,
   wherein the second housing comprises a first end, an electrode body and a second end which are arranged in this order,
   the first end is a first curved structure including a fixing post which has a third through hole and at least one second clamping groove structure, the at least one second clamping groove structure is engaged with the at least one first clamping groove structure and the third through hole and the second through hole are aligned with each other when the fixing post is inserted into the first through hole, so that the restriction post of the restriction pin is inserted into the second through hole and the third through hole,
   the electrode body is provided with at least one second annular electrode and a second annular insulator which is arranged between adjacent one of the at least one second annular electrode, and the at least one second annular electrode is provided respectively for the at least one first annular electrode,
   the second end is conical.

10. The detachable leadless pacemaker system for cardiac conduction bundle pacing according to claim 9, wherein the first detachable structure is provided with at least one second contact at a side near the housing body, and the at least one second contact is coupled to the circuit board.

11. The detachable leadless pacemaker system for cardiac conduction bundle pacing according to claim 10, wherein a second switch is provided between the circuit board and each of the at least one second contact, the second switch is used for controlling connection and disconnection between the circuit board and the second contact.

12. The detachable leadless pacemaker system for cardiac conduction bundle pacing according to claim 11, wherein the first hook-shape side electrode comprises at least one second electrode lead respectively for the at least one second annular electrode, the at least one second electrode lead is arranged in the second housing, including a second electrode lead with one end being coupled with corresponding one of the at least one second annular electrode and the other end being arranged in the fixing post,
   the at least one second electrode lead is coupled with corresponding one of the at least one second contact when the fixing post is inserted into the first through hole.

13. The detachable leadless pacemaker system for cardiac conduction bundle pacing according to claim 12, wherein the first annular electrode is coupled with a first power terminal of the battery on the circuit board through the corresponding first contact, and the second annular electrode is coupled with a second power terminal of the battery on the circuit board through the corresponding second contact.

14. The detachable leadless pacemaker system for cardiac conduction bundle pacing of claim 9, wherein at least one first positioning structure is provided at the second end of the second housing at a side near the first pacemaker body.

15. The detachable leadless pacemaker system for cardiac conduction bundle pacing of claim 9, wherein the passive pacemaker comprises:
   a second pacemaker body with a second detachable structure;
   a second hook-shape side electrode which is fixed with the second pacemaker body by the second detachable structure, and which is arranged in parallel with the second pacemaker body at a second predetermined distance.

16. The detachable leadless pacemaker system for cardiac conduction bundle pacing of claim 15, wherein the second pacemaker body is cylindrical.

17. The detachable leadless pacemaker system for cardiac conduction bundle pacing of claim 15, wherein the detachable pacemaker is provided with a first connection part on the first detachable structure,
   the passive pacemaker is provided with a second connection part on the second detachable structure,
   the first connection part and the second connection part are used for achieving a reliable connection between the detachable pacemaker and the passive pacemaker.

18. The detachable leadless pacemaker system for cardiac conduction bundle pacing according to claim 17, wherein the first hook-shape side electrode has an insertion direction which is opposite to that of the second hook-shape side electrode in a state that the first connection part and the second connection part are reliably connected.

19. The detachable leadless pacemaker system for cardiac conduction bundle pacing of claim 15, wherein the second pacemaker body includes at least one third annular electrode and a third annular insulator which is arranged between adjacent one of the at least one third annular electrode,
   the second hook-shape side electrode comprises at least one fourth annular electrode and a fourth annular insulator which is arranged between adjacent one of the at least one fourth annular electrode, and
   the passive pacemaker encapsulates an electronic circuit which is coupled to the at least one third annular electrode and the at least one fourth annular electrode, respectively.

20. The detachable leadless pacemaker system for cardiac conduction bundle pacing of claim 15, wherein the second pacemaker body includes no electronic circuit, and is coupled to the at least one third electrode and the at least one fourth annular electrode respectively by signal wires.

21. The detachable leadless pacemaker system for cardiac conduction bundle pacing according to claim 9, wherein the detachable pacemaker system further includes a mounting wire with a first wire end having a first ring and a second wire end having second ring, the first ring surrounds the first curved structure of the first hook-shape side electrode of the detachable pacemaker, and the second ring that surrounds the second curved structure of the second hook-shape side electrode of the passive pacemaker.

22. The detachable leadless pacemaker system for cardiac conduction bundle pacing according to claim 3, wherein the first annular insulator is provided with an array of apertures at a side near the first hook-shape side electrode, including at least one aperture for holding a drug.

* * * * *